Figure 1:
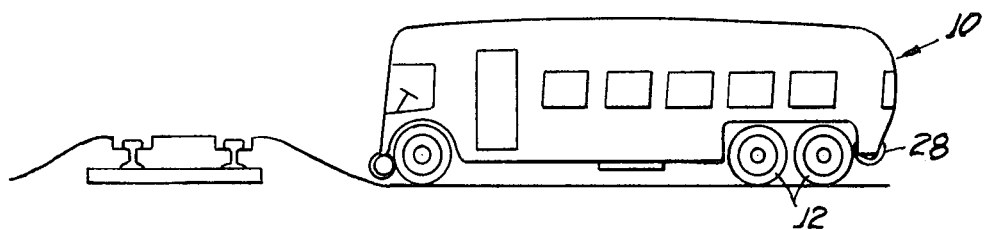

United States Patent

Yard

[15] 3,638,580

[45] Feb. 1, 1972

[54] CONVERTIBLE RAIL-HIGHWAY VEHICLE

[72] Inventor: William James Yard, Cavan, Australia

[73] Assignee: Aresco Trak-Chief Proprietary Limited, Cavan, South Australia, Australia

[22] Filed: Mar. 4, 1970

[21] Appl. No.: 16,368

[30] Foreign Application Priority Data

Mar. 4, 1969 Australia ..........................51,409/69

[52] U.S. Cl. ......................105/215 C, 105/174, 105/224 R
[51] Int. Cl. ..................B61d 15/00, B61f 9/00, B62d 61/12
[58] Field of Search....................105/215, 215 C, 174, 224 R

[56] References Cited

UNITED STATES PATENTS

| | | | |
|---|---|---|---|
| 2,039,489 | 5/1936 | Messick | 105/215 C |
| 1,938,049 | 12/1933 | Serrano | 105/215 C |
| 2,016,626 | 10/1935 | Constantinesco | 105/215 |
| 2,655,872 | 10/1953 | Templeton | 105/215 C |

*Primary Examiner*—Arthur L. La Point
*Assistant Examiner*—Howard Beltran
*Attorney*—Oldham & Oldham

[57] ABSTRACT

Means for retaining flanged wheels in contact with rails on a convertible rail-highway vehicle in which traction is effected through the normal highway-engaging pneumatic tired wheels riding on the rails, utilizing a load transfer arm pivoted to the chassis of the vehicle in such a way that a portion of the weight of the vehicle is applied to the flanged wheels thereby reducing danger of derailment.

6 Claims, 5 Drawing Figures

PATENTED FEB 1 1972 3,638,580

SHEET 1 OF 2

INVENTOR
WILLIAM JAMES YARD
BY
Oldham & Oldham
ATTORNEYS

CONVERTIBLE RAIL-HIGHWAY VEHICLE

This invention relates to rail engagement means for the engagement of the rails of a permanent way of a vehicle which is arranged to travel either by highway or by rail.

It has been proposed to employ a convertible rail-highway vehicle provided with retractable rail engagement wheels so that the vehicle can be driven over a highway on pneumatic tires or alternatively along rails when the pneumatic tires are used for traction purposes only, the retractable flanged wheels being lowered to engage the rails so as to retain the vehicle on the rail track.

With previously proposed convertible rail-highway vehicles a problem has existed in that a heavily laden vehicle can under some circumstances bounce on its pneumatic tires and thereby become derailed, and one of the objects of this invention is to provide means whereby a load is applied to the retractable flanged wheels urging them into engagement with the rails in such a way that the danger of derailment is substantially reduced.

In one of its forms the invention may include a longitudinally extending load transfer arm on each side of the vehicle chassis, pivot means pivotally supporting each load transfer arm intermediate it ends to the chassis, and traction wheel support means and shiftable flanged wheel support means both carried on each load transfer arm but spaced fore and aft of the pivot means, whereby part of the load of the vehicle is supported by the traction wheels and part is supported by the shiftable flanged wheels. By this means any dead load applied to the arm (static loading) will be partly taken by the pneumatic tired traction wheel and partly taken by the shiftable flanged wheels, while any dynamic load will be similarly distributed thereby reducing danger of derailment of the vehicle for any reason (for example rail irregularity). If a load support spring is interposed between the shiftable flanged wheel and the load transfer arm, the shiftable flanged wheel can be retained against a rail notwithstanding wheel bounce.

Figure 2:
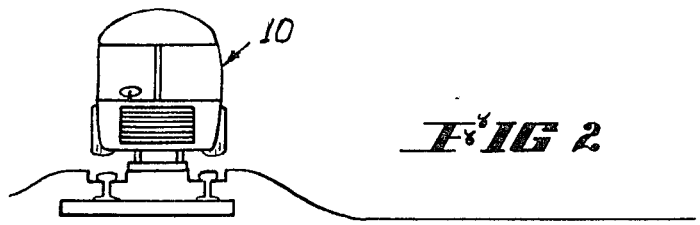
Figure 3:
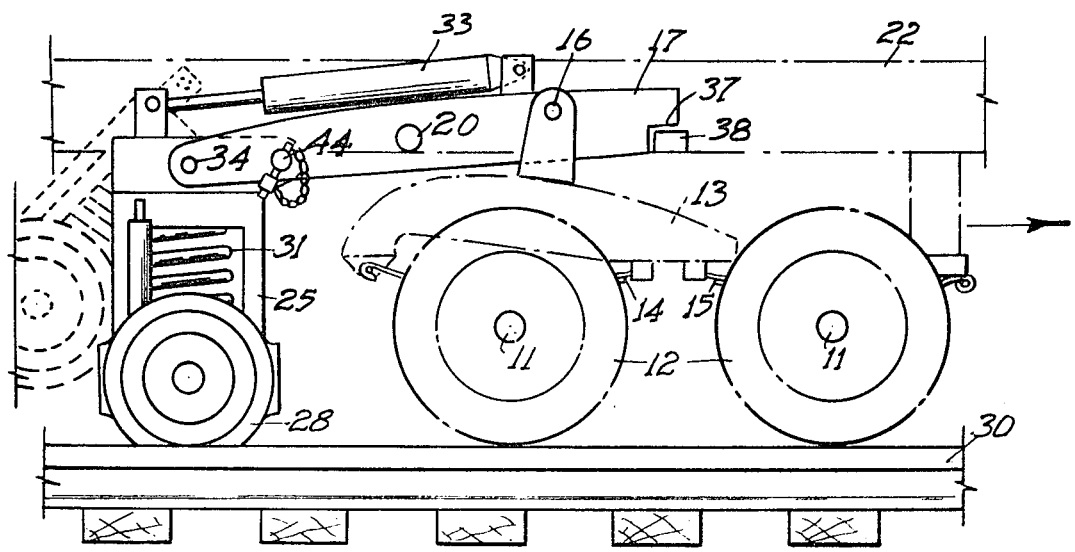
Figure 4:
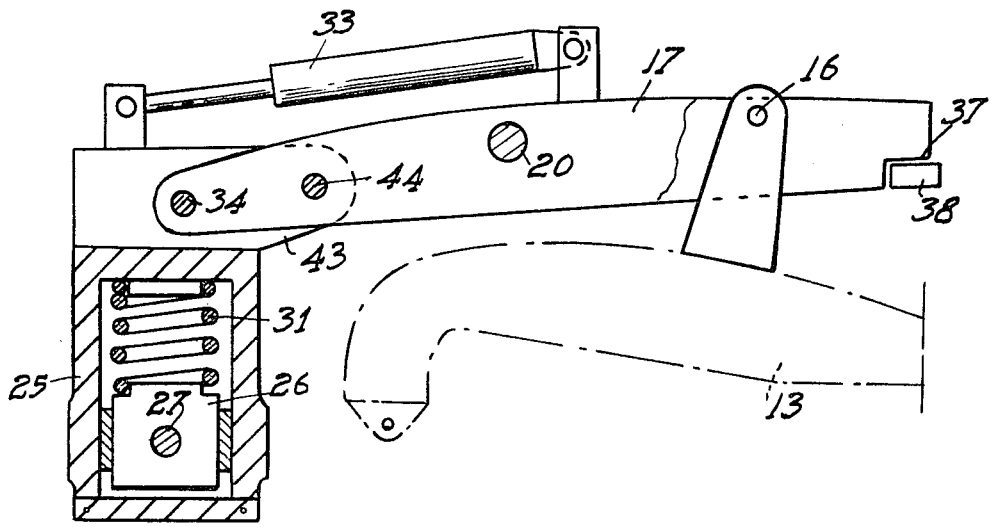
Figure 5:
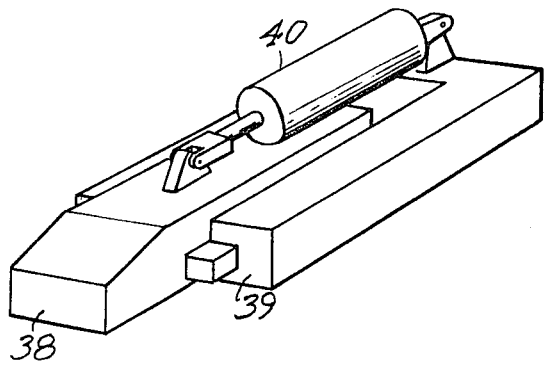

Although constructional details of the invention can vary considerably within this invention, an embodiment is described hereunder in some detail with reference to and is illustrated in the accompanying drawings, in which:

FIG. 1 illustrates diagrammatically a convertible rail-highway vehicle on a highway but adjacent a rail track, FIG. 2 illustrates diagrammatically the vehicle positioned above the track and swing around on a retractable turntable to align with the track, FIG. 3 is an enlarged fragmentary elevational view showing rear traction wheels and a rear shiftable flanged wheel in engagement with a rail, FIG. 4 is a similar view, but in section, and FIG. 5 is a perspective view showing an arrangement for driving a wedge beneath one end of the load transfer arm.

According to this embodiment a heavy duty convertible rail-highway vehicle 10 is provided with two rear axles 11 each carrying highway-engaging pneumatic tired traction wheels 12. The wheels are interconnected by means of a spring support arm 13 which transfers the load from the rear end of the front springs to the rear end of the rear springs, this being a known arrangement. A fixed pivot pin 16 pivotally supports each of the spring support arms 13 to the chassis of the vehicle, each pivot pin 16 being pivoted in its arm between the ends of the arm in such a way that some of the weight of the vehicle is borne on each of the rear traction wheels 12. Each pivot pin 16 is secured to and extends outwardly from a respective secondary load transfer arm 17.

In this embodiment a pair of rearwardly extending secondary load transfer arms 17 are employed, each being pivoted intermediate its ends on a respective pivot pin 20 extending outwardly from and secured to the main chassis 22 of the vehicle 10. Each secondary load transfer arm 17 is pivoted to a respective spring support arm 13, utilizing the same pivotal axis as was previously employed for carrying the spring support arm 13 from the chassis, the old pivot means between the spring support arm and the chassis however being removed.

The rear end of each of the secondary load transfer arms 17 pivotally supports a rear frame 25 which carries in it bearings 26 (FIG. 4) in which is journaled a transverse axle 27 carrying shiftable flanged wheels 28 on each end. When the secondary load transfer arm 17 is in its down position, the shiftable flanged wheels 28 engage the rails 30 of a permanent way. The axle is supported through suspension springs 31.

The frame 25 which carries the shiftable flanged wheels is coupled to the secondary load transfer arm by a retracting cylinder 33, this retracting cylinder being operable to tilt the frame about a pivotal-mounting pin 34 so that the shiftable flanged wheels are lifted clear of the rails.

The forward end of each of the secondary load transfer arms 17 project forwardly of the pivot pin 16 about which they are coupled to the primary spring support arms 13, and is provided with a recess portion arranged to accommodate a sliding wedge 38 (FIG. 5). Each wedge is carried in slides 39 fixed to the chassis, and is arranged with a single cylinder 40, the cylinder then expanded driving the wedge outwardly thereby firmly fixing the respective secondary load transfer arm 17 against any pivotal movement relative to the chassis. In this way the forward pivot pin 16 between the spring support arm and secondary load transfer arms become fixed relative to the chassis, and the vehicle can operate in a normal way on its highway-engaging pneumatic tired wheels. However when the retracting cylinder is retracted and wedge is withdrawn, the secondary load transfer arm is capable of pivoting about its pivotal interconnection with the chassis and this then transfers some of the vehicle load from the traction wheels on to the shiftable flanged wheels. If the proportion of lengths between the three pivotal axes along the secondary load transfer arm is say, in the proportion of 6:4, then 40 percent of the load of the vehicle can be applied to the shiftable flanged wheels and 60 percent to the traction wheels, this being a typical suitable proportion for average operating conditions.

Under dynamic conditions it is clearly desirable that the shiftable flanged wheels should be locked in their position relative to the load transfer arm, and to achieve this the rear frame 25 has forwardly projecting lugs 43 (FIG. 4) which are apertured and the apertures in the forwardly projecting lugs align with corresponding apertures in the secondary load transfer arm 17, and these aligned apertures have locking pins 44 passing therethrough. In this embodiment the locking pins are formed to be a neat fit in the aligned apertures, and the pins are provided with outstanding bars which are arranged to rotate into receiving sockets (not shown), thus preventing inadvertent release of the pins under operating conditions.

The above embodiment has been described in relation to a heavy duty vehicle having a pair of back axles to carry pneumatic tired highway-engaging wheels. However it will be seen that the invention is equally applicable to a vehicle having a single back axle, in which case the pivot point between the ends of the axle remains unchanged, and the single back axle load is transferred as previously to the front end of the secondary load transfer arm (which in such a case becomes the only load transfer arm), and locking means again are provided as previously, the locking means being operable when the shiftable flanged wheels are in their retracted position.

What I claim is:

1. Road engagement means for a convertible rail-highway vehicle having a chassis with pneumatic tired rear traction wheels and adjacent rear flanged wheels, comprising:
   a longitudinally extending load transfer arm on each side of the vehicle chassis;
   pivot means connecting each load transfer arm intermediate its ends to the chassis;
   first suspension means pivotally connected to the load transfer arm between the pivotal connection of the arm to the chassis and a first end of the arm, the first suspension means being connected to the traction wheels; and
   shiftable second suspension means connected to the other end of the load transfer arm and on the opposite side of the pivotal connection between the arm and the chassis from the first suspension means, the second suspension means being connected to the flanged wheels.

2. Rail engagement means according to claim 1 further comprising a lock member releasably engaging the load transfer arm locking the load transfer arm against movement about its pivotal support means when the transfer arm is engaged but releasing the transfer arm for pivotal movement when the locking means is disengaged.

3. Rail engagement means according to claim 1 comprising a slide member secured to the vehicle chassis, a hydraulic cylinder coupled at one end to the slide member, said lock member being a wedge-shaped lock member guided for movement in the slide member and coupled to the other end of the hydraulic cylinder, the wedge-shaped lock member being movable under control of the hydraulic cylinder to engage the load transfer arm locking the load transfer arm against movement about its pivotal support means but retractable to release the load transfer arm for pivotal movement.

4. Rail engagement means according to claim 1, further comprising a pivot pin connecting the load transfer arm with suspension springs of the pneumatic tired traction wheels.

5. Rail engagement means according to claim 1, comprising further pivot means on the load transfer arm, a frame pivotally supported by the further pivot means, bearings guided for movement in the frame and urged downwardly by suspension springs, an axle extending through the bearings and carrying said rail-engaging wheels, and means to retain the frame against pivotal movement with respect to the load transfer arm.

6. Rail engagement means according to claim 5, further comprising a retracting cylinder operably coupling said pivoted frame and load transfer arm and arranged to pivot the frame to a position where the rail-engaging wheels are retracted from engagement with the rails.

* * * * *